Feb. 2, 1943.   A. PERON   2,309,784
BROILER
Filed July 19, 1939    2 Sheets-Sheet 1

INVENTOR.
Anthony Peron,
BY
ATTORNEY.

Feb. 2, 1943.                A. PERON                2,309,784
                              BROILER
                        Filed July 19, 1939        2 Sheets-Sheet 2
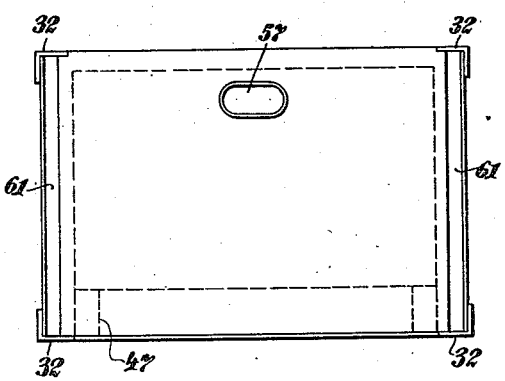
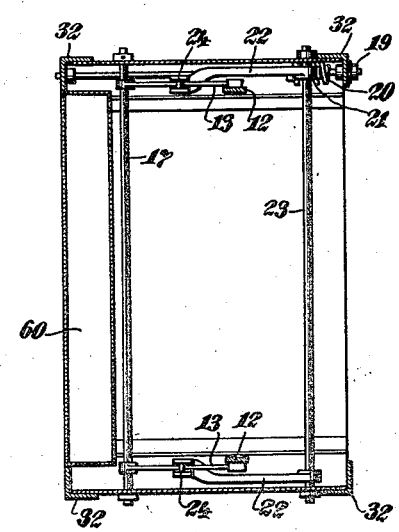
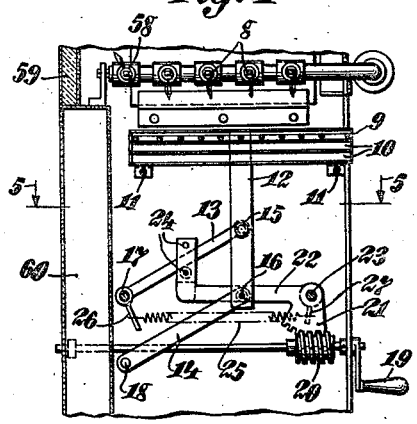
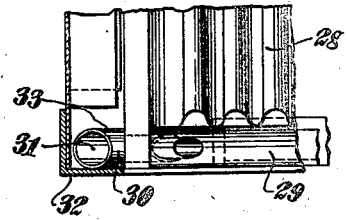
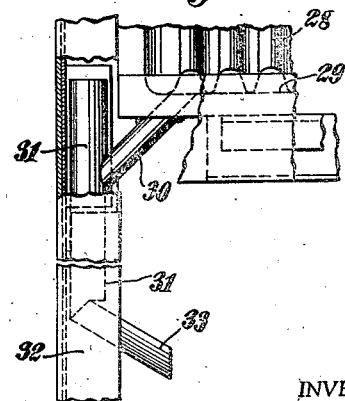
INVENTOR.
Anthony Peron,
BY
ATTORNEY.

Patented Feb. 2, 1943

2,309,784

UNITED STATES PATENT OFFICE 2,309,784

BROILER

Anthony Peron, New York, N. Y.

Application July 19, 1939, Serial No. 285,301

1 Claim. (Cl. 126—41)

The present invention relates to broilers.

Special objects of the invention are to provide a broiler adapted for various cooking requirements, such as encountered in restaurant service, which will combine in the same structure desirable warming oven accommodations, which will be well insulated to hold the heat and prevent radiation to a surrounding room; which will be readily adjustable and convertible to meet different cooking requirements and which will be generally practical for the purposes intended.

Other objects and the novel features of the invention by which all such objects are attained are set forth or will be apparent from the following specification.

The drawings accompanying and forming part of the specification illustrate one practical commercial embodiment of the invention. Structure however, may be modified and changed as regards this disclosure all within the true spirit and scope of the invention as hereinafter defined and claimed.

Fig. 3 is a top plan view of the apparatus.

Fig. 4 is a broken sectional detail showing the adjustable broiler grille raised, in contrast to the lowered position of the same shown in Fig. 2.

Fig. 5 is a horizontal sectional view as on line 5—5 of Fig. 4.

Fig. 6 is a broken part sectional plan of the upper broiler grille.

Fig. 7 is a broken part sectional front view illustrating the drain connections from the upper grille.

In the form of the invention illustrated, heat is conserved and utilized as fully as possible by locating an open flame broiler at the bottom, a closed, flame heated broiler above that and an insulated warming oven above the closed broiler.

Figure 1:
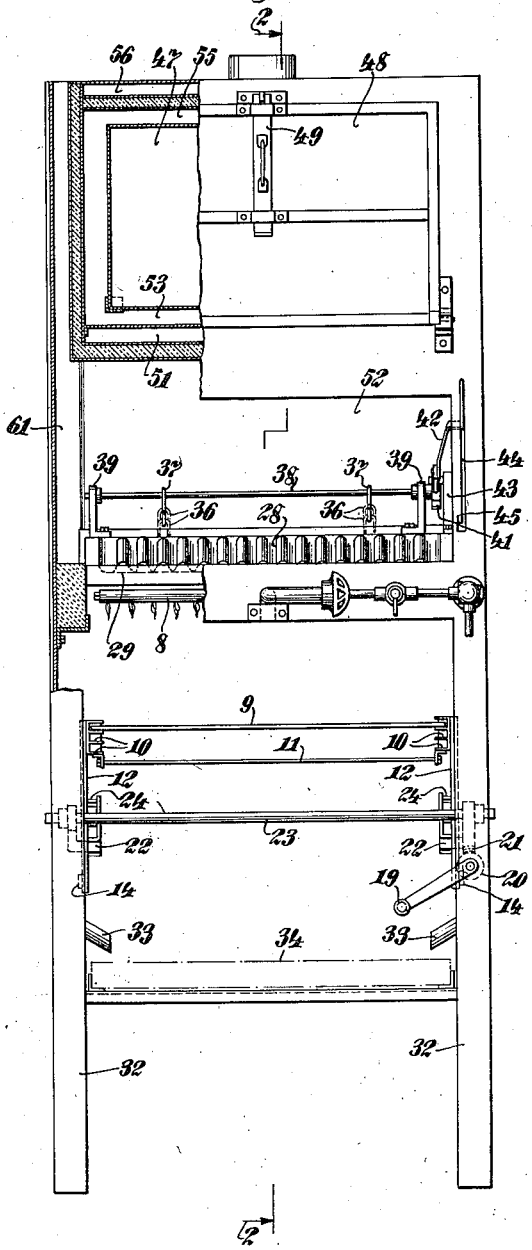
Fig. 1 is a broken and part sectional front elevation of one of the broilers.
Figure 2:
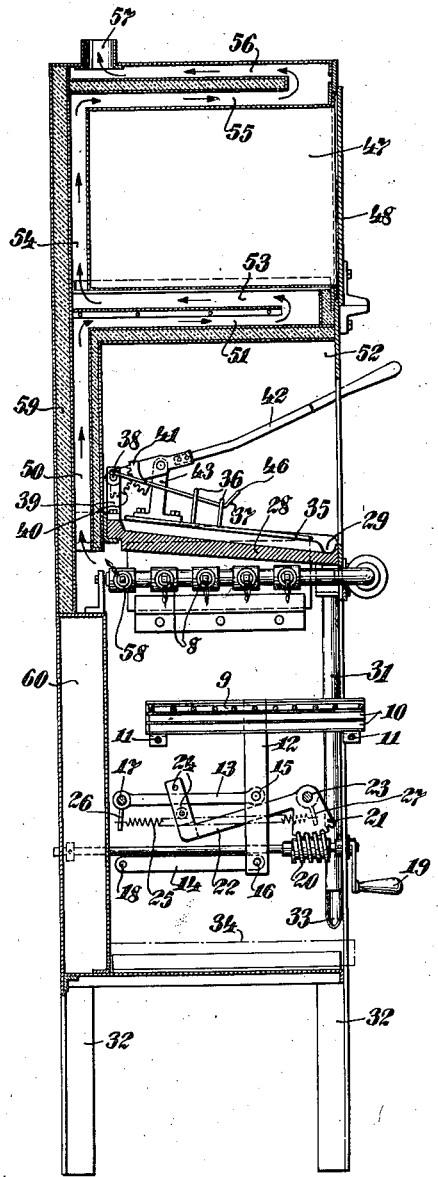
Fig. 2 is a vertical sectional view as on substantially the plane of line 2—2 of Fig. 1.

The lower, open flame broiler is shown in Figs. 1, 2 and 4, as comprising a burner made up of pipes 8, having jet openings directed downwardly toward a grille 9, removably and adjustably related thereto.

The grille 9, is indicated as slidably engageable in supporting channels 10, at different levels and connected together in spaced relation by spreader rods 11, said channels being carried by bars 12, at opposite sides of the machine and which are supported and maintained in vertical position by parallel links 13, 14, pivoted to said bars at 15, 16, and pivoted to the sides of the machine at 17, 18.

Vertical adjustment of the grille is effected by means of a hand crank 19, at the front of the machine connected with a worm 20, which engages the worm segment 21, of a lever 22, pivoted at 23, and having spaced shoulders 24, Figs. 2 and 4, for engaging the upper parallel link 13. In the broiler shown there are two such lifting levers 22, fixed on the pivot shaft 23, and engaging the links 13, at opposite sides of the machine. To aid in the lifting movement and in effect counterbalance the weight of the parts, a spring 25, is shown connected between rock arms 26, 27, attached to the rock shafts 17, 23, respectively.

With this construction, the broiler grille 9, can be quickly and easily raised and lowered at any time. The worm gear is of the self-locking type, so that the grille will be automatically held and locked in the position to which it has been adjusted. The grilles can be quickly removed from and replaced in the channels, which facilitates cleaning and substitution of one form of grille for another. The provision of a number of channels located at different levels further extends the range or possibilities of adjustment for various broiling purposes.

The upper broiler is shown as consisting of a downwardly and forwardly inclined ridged or corrugated broiler plate 28, directly above the burner 8, and forming the bottom of a chamber which is open to the front of the apparatus. This ridged plate has a grease collecting gutter 29, at the forward lower end of the same from which extend drains 30, inclined into pipes 31, concealed in the angles of the forward corner legs 32, and having spouts 33, at the lower ends directed into a water pan 34.

For holding the material down on the sloping ridges of the broiler, a grid 35, is shown having upwardly extending loops 36, Figs. 1 and 2, by which it is loosely, self-adjustingly and removably hung on the forwardly projecting arms 37, of a rock shaft 38, journalled in brackets 39, at the back of the grille and having at one end a gear segment 40, engaged by gear segment 41, on the rearward end of hand lever 42, pivotally mounted on bracket 43. This hand lever is shown in Fig. 1 as extending through a vertical slot 44, in the front of the apparatus, which slot has a horizontal offset 45, at the lower end of the same into which the lever can be shifted if and when it is desired to temporarily hold the grid in an upraised position, clear of the broiler plate. The upwardly angled forward ends 46, of the supporting arms 37, prevent the grid from accidentally slipping off but permit the grid to be readily removed when so desired.

The warming oven 47, Figs. 1 and 2, is shown as directly above the upper broiler chamber and as having a hinged front door 48, held normally closed by a readily releasable latch 49.

In this invention, a single burner is made to supply the heat for the lower open flame broiler, the upper, closed in broiler and for the warming open at the top. This is accomplished by special construction and arrangement of the burner, relative location of the several parts and by circulation of the heat in a manner utilizing it to best advantage.

In Fig. 2, the lower open flame compartment is shown as opening into a vertical flue 50, across the back of the broiler casing, which flue is extended at 51, forwardly over the top of the upper broiler chamber 52, thence rearwardly at 53, beneath the bottom of the warming oven, upwardly at 54, across the back of the warming oven, forwardly at 55, over the top of the warming oven and then to the rear at 56, to an outlet duct 57. To supply a certain amount of direct heat into this passage, the burner is shown as having one burner tube 58, at the rear with rearwardly and upwardly directed flame jets.

To prevent waste of heat, the circuitous heating and exhaust gas passage described may be insulated where necessary, substantially as indicated at 59. Particularly such insulation preferably is provided in the outer walls of the casing, especially in the back wall as shown in Fig. 2. The lower chamber is indicated as insulated at the back by an air insulating chamber 60.

The flue described carries off any smoke and waste products from the burner and such cooking odors as may be created at the lower open flame broiler.

The upper closed in broiler chamber 52, is shown as having separate flues 61, Fig. 1, at the sides of the same opening up through the top of the casing as indicated in Fig. 3.

This invention makes it possible for a single burner structure to efficiently serve for an open flame broiler, a closed broiler and for warming oven purposes. The slope of the broiler plate 28, which forms the roof of the lower broiler chamber, directs smoke and waste products from the burner rearwardly into the waste flue 50. The upwardly directed burner jets 58, at the rear, in addition to directly heating this flue also furnish some heat to the upper portion of the inclined broiler plate.

In addition to being heated from the main flue passage, extending beneath the bottom up the back and across the top of the same, the warming oven receives heat also from the flues 61, from the upper broiler chamber, which as indicated in Fig. 1, extend upward across the ends of the warming oven. To enable a certain control of the heat in the warming oven, the latch 49, which secures the oven door, may be constructed to hold this door in different positions, partially as well as fully closed.

What is claimed is:

Cooking apparatus, comprising in combination, a lower, open flame broiler chamber, a closed broiler chamber above said first chamber and open to the front of the apparatus and a warming oven above said second broiler chamber and having a door at the front of the same, the floor of the second chamber and roof of the first chamber being formed by a downwardly and forwardly inclined ridged broiler plate, a heating and waste products flue extending from beneath the rearward upper end of said inclined broiler plate, upwardly at the back of the apparatus, thence forwardly over the top of the second chamber, thence rearwardly beneath the warming oven, upwardly at the back of the warming oven, forwardly over the top of the warming oven and thence rearwardly to an escape outlet, and a burner in the lower open flame broiler chamber directly beneath said forwardly inclined broiler plate for directly heating said broiler plate, for furnishing the heat for cooking in the lower open flame broiler chamber and for supplying heat to the top warming oven through the aforesaid flue construction, said flue being insulated at the back and insulated where it extends up at the back and over the top of said second chamber to thereby conserve and carry heat to the open above said second chamber.

ANTHONY PERON.